(12) United States Patent
Yu et al.

(10) Patent No.: US 7,098,607 B2
(45) Date of Patent: *Aug. 29, 2006

(54) ELECTRONIC BALLAST WITH LOSSLESS SNUBBER CAPACITOR CIRCUIT

(75) Inventors: Qinghong Yu, Salem, MA (US); Christopher Radzinski, Huntsville, AL (US); John Jay Dernovsek, Madison, AL (US); Peter Shackle, Rolling Hills Estates, CA (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/004,667

(22) Filed: Dec. 3, 2004

(65) Prior Publication Data

US 2005/0168166 A1 Aug. 4, 2005

Related U.S. Application Data

(60) Provisional application No. 60/526,638, filed on Dec. 3, 2003.

(51) Int. Cl.
H05B 37/02 (2006.01)

(52) U.S. Cl. ............... 315/291; 315/224; 315/307; 315/DIG. 7

(58) Field of Classification Search ......... 315/291, 315/224, 225, 307, 209 R, 105, 106, DIG. 2, 315/DIG. 5, DIG. 7
See application file for complete search history.

(56) References Cited

U.S. PATENT DOCUMENTS

| | | | |
|---|---|---|---|
| 5,083,065 A * | 1/1992 | Sakata et al. | 315/DIG. 7 |
| 5,436,529 A | 7/1995 | Bobel | 315/106 |
| 5,444,336 A * | 8/1995 | Ozawa et al. | 315/DIG. 5 |
| 5,493,180 A | 2/1996 | Bezdon et al. | 315/106 |
| 5,500,576 A | 3/1996 | Russell et al. | 315/307 |
| 5,636,111 A | 6/1997 | Griffin et al. | 315/225 |
| 5,770,925 A | 6/1998 | Konopka et al. | 315/225 |
| 5,945,788 A | 8/1999 | Li et al. | 315/291 |
| 5,969,483 A | 10/1999 | Li et al. | 315/224 |
| 5,982,106 A | 11/1999 | Bobel | 315/209 R |
| 6,121,731 A * | 9/2000 | Kanazawa et al. | 315/209 R |
| 6,127,786 A | 10/2000 | Moisin | 315/291 |
| 6,169,369 B1 | 1/2001 | Nerone et al. | 315/106 |
| 6,211,623 B1 | 4/2001 | Wilhelm et al. | 315/224 |
| 6,259,215 B1 * | 7/2001 | Roman | 315/307 |
| 6,316,887 B1 | 11/2001 | Ribarich et al. | 315/307 |

(Continued)

FOREIGN PATENT DOCUMENTS

EP 0061730 6/1982

(Continued)

Primary Examiner—Wilson Lee
Assistant Examiner—Ephrem Alemu
(74) Attorney, Agent, or Firm—Waddey & Patterson; Jason L. Hornkohl

(57) ABSTRACT

An improved high input voltage instant start electronic ballast uses a substantially lossless snubber circuit. The substantially lossless snubber circuit is incorporated into the ballast to reduce turn off losses and increase the efficiency of the ballast. The snubber circuit includes two capacitors connected in parallel with respect to the two switching transistors or FETS in the inverter of the ballast. A series-resonant lamp voltage sensing circuit is also provided that uses a voltage dividing capacitor to accomplish lossless monitoring of the open circuit voltage of the ballast. A cable compensation circuit minimizes variations in the open circuit voltage due to the connecting and disconnecting of a cable to the ballast by limiting the turn on times of the transistors during high voltage conditions.

20 Claims, 3 Drawing Sheets

U.S. PATENT DOCUMENTS

| | | | |
|---|---|---|---|
| 6,424,101 B1 * | 7/2002 | Sabate | 315/291 |
| 6,501,225 B1 | 12/2002 | Konopka | 315/105 |
| 6,552,494 B1 | 4/2003 | Randazzo et al. | 315/106 |
| 6,936,973 B1 * | 8/2005 | Parra et al. | 315/224 |
| 2002/0105283 A1 | 8/2002 | Murakami et al. | 315/224 |
| 2003/0025464 A1 | 2/2003 | Konopka | 315/291 |

FOREIGN PATENT DOCUMENTS

EP          0576991          5/1994

* cited by examiner

ELECTRONIC BALLAST WITH LOSSLESS SNUBBER CAPACITOR CIRCUIT

CROSS-REFERENCES TO RELATED APPLICATIONS

This application is a Non-Provisional Utility application which claims benefit of co-pending U.S. patent application Ser. No. 60/526,638 filed Dec. 3, 2003, entitled "High Input Voltage Microcontroller Based Instant Start Ballast" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

One problem with prior art electronic ballasts is that the open circuit voltage of an instant-start ballast needs to be controlled when there is not a lamp coupled to the ballast. Unfortunately, prior art methods of providing this open circuit voltage control cause substantial variations in the open circuit voltage when used in conjunction with different lengths of cable, or require a high value resonant capacitor which results in a high circulating current. A high circulating current is undesirable in that it increases the conduction losses in the ballast and may result in damaging capacitive mode switching occurring during the striking transients. Therefore, an improved method and apparatus for controlling the open circuit voltage of a high input voltage electronic ballast without increasing the switching losses or creating high value circulating currents is needed.

In some prior art ballasts, the voltage on the lamp voltage sensing resistor is used to control the open circuit voltage during striking when no lamp is connected. To accomplish this, the pulse width of one switch of the half bridge is typically controlled. Controlling the pulse width controls the open circuit voltage indirectly by using inductor current to control the voltage on the capacitor. As a result, large open circuit voltage variations often result when external connections to the fixture, such as a connecting cable, add extra capacitance. In ballast implementations that can afford to use a large resonant capacitor and a small inductor, the open circuit voltage variation problem is generally not too significant. However, potentially damaging hard switching or capacitive mode switching is often observed in these high capacitance types of prior art open circuit voltage controlled ballasts. Furthermore, the use of a large resonant capacitor makes the resonant tank difficult to design. As a result, these types of ballasts suffer from more conduction losses and/or hard switching during the striking of the lamp than do typical ballasts. Conduction losses and hard switching are undesirable in that they may cause the ballast to fail. A large resonant capacitor, with a striking voltage of two lamps across it, stores a substantial amount of energy. When the striking attempt occurs when there is no load, the striking energy is transferred to the resonant inductor and can saturate the inductor. The result is undesirable hard switching occurring during the striking. Even though a MOSFET can survive the high stress transients in ballasts with a 460V bulk voltage, hard switching is undesirable and should be avoided if possible. Furthermore, for some types of ballasts, it is critically important to avoid hard switching due to their particular susceptibility to damage from transients. Thus, in many of the prior art ballasts, the resonant capacitor value is minimized and a cable compensation circuit is utilized to control the open circuit voltage such that it is constant with various lengths of connected cable attached having varying amounts of capacitance. However, these circuits are often complex and decrease the efficiency, while increasing the cost, of the ballast. Therefore, an improved method and apparatus for controlling the open circuit voltage of a ballast and compensating for any attached cables is needed.

Therefore what is needed is a new and improved electronic ballast that overcomes the above mentioned deficiencies of the prior art.

BRIEF SUMMARY OF THE INVENTION

A preferred embodiment of the present invention is directed toward an electronic ballast for producing an output voltage on a pair of output terminals for igniting and powering a gas discharge lamp connected between the output terminals. The ballast includes an inverter having a pair of transistors. A snubber circuit reduces turn off losses in the transistors. The snubber circuit includes a pair of series connected snubber capacitors connected in parallel with the pair of transistors. An extended dead time is created between gating signals of the pair of transistors to allow the snubber capacitors to discharge. The electronic ballast includes a resonant tank having a series connected tank inductor and tank capacitor and an output voltage sensing circuit that senses an output voltage of the ballast by sensing a voltage across a sampling capacitor connected in series with the tank capacitor. An open circuit voltage control circuit is also preferably included that controls a voltage across the output terminals when a gas discharge lamp is not connected between the output terminals. The open circuit voltage control circuit includes a resistor connected in series with a tank capacitor of the ballast. A cable compensation circuit is also preferably included that limits variations in the output voltage of the electronic ballast due to a cable being connected to the output terminals of the ballast. The cable compensation circuit limits variations in the output voltage by altering the gating signals provided to the transistors.

Another embodiment of the present invention is directed toward an electronic ballast for providing an output voltage on a pair of output terminals for use in powering a gas discharge lamp. The ballast includes an inverter circuit having a first transistor and a second transistor and a resonant tank having a tank capacitor and a tank inductor. A substantially lossless snubber circuit reduces turn-off losses in the first and second transistors of the inverter. The snubber circuit includes a snubber capacitor connected in parallel with each of the first transistor and the second transistor. A microcontroller provides gating signals to the transistors such that an extended dead time is created between the gating signals of the transistors to allow the snubber capacitors to discharge. An open circuit voltage control circuit controls a voltage across the output terminals of the ballast when a gas discharge lamp is not connected between the output terminals. A sampling capacitor connected in series with the tank capacitor wherein an output voltage of the ballast is sampled across the sampling capacitor.

Yet another embodiment of the present invention is directed toward an electronic ballast having a half-bridge inverter circuit that includes a pair of transistors and a pair of capacitors. Each capacitor is connected in parallel with one of the transistors. A microcontroller generates transistor switching control signals that cause the transistors to switch on and off at a rate that allows the capacitors to reduce turn off losses in the transistors. This is preferably accomplished by creating an extended dead time between the gating signals of the pair of transistors that allows the capacitors to discharge. The electronic ballast has a resonant tank having a series connected tank inductor and tank capacitor. A sampling capacitor is connected in series with the tank capacitor wherein an output voltage of the ballast is sampled across the sampling capacitor. An open circuit voltage control circuit is also included that controls a voltage across the output terminals of the ballast when a gas discharge lamp is not connected between the output terminals. The open circuit voltage control circuit has a resistor connected in series with the sampling capacitor and the voltage across the resistor is used to limit the output voltage of the electronic ballast. A cable compensation circuit is also preferably provided to limit variations in the output voltage due to cables being connected to outputs of the ballast.

DETAILED DESCRIPTION OF THE INVENTION

A preferred embodiment of the present invention is directed toward an instant start electronic ballast for a gas discharge lamp having a substantially lossless snubber circuit for reducing the turn off loses of the transistors in the inverter of the ballast. For voltage-fed, series-resonant, half-bridge inverters, the turning-on of the FETS or transistors involves zero voltage switching, but the turning-off of the FETS and transistors involves hard switching. For most ballasts, the turning-off current is small so that losses associated with the turning-off are not significant. However, for an Instant Start—High Range Voltage ballast, the current at turn-off is near its peak and, thus, the turn-off losses are relatively high. Furthermore, due to the larger die size of the high voltage FETS, more gate charge has to be removed from the gates before they can be turned-off. This increased gate charge increases the turn-off losses for a high voltage inverter.

Figure 1:
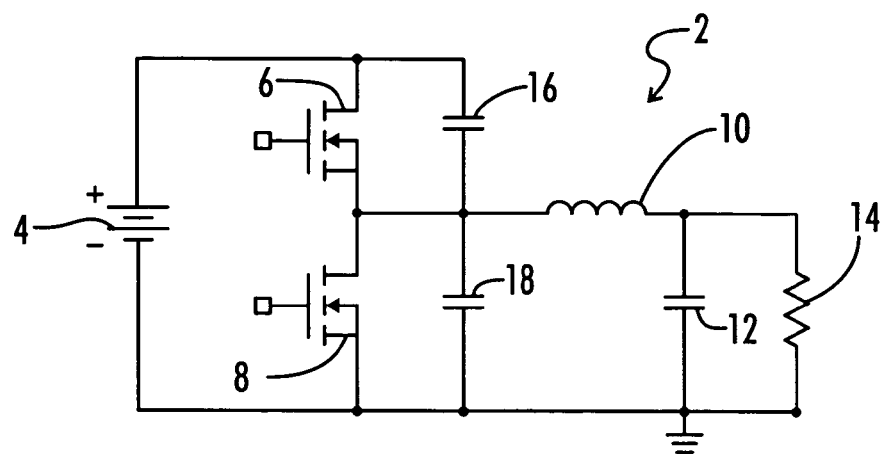
FIG. 1 is a schematic diagram of a lossless snubber circuit constructed in accordance with a preferred embodiment of the present invention.

A simplified schematic of an electronic ballast 2 constructed in accordance with a preferred embodiment of the present invention is shown in FIG. 1. The electronic ballast consists of a bulk DC voltage stage 4 that provides a relatively constant DC voltage to the inverting transistors 6 and 8. In a typical fluorescent light ballast, the bulk DC voltage stage 4 includes a bridge rectifier that converts a standard AC supply voltage into a DC voltage. However, it will be readily appreciated by those skilled in the art that a variety of power sources may be utilized to provide a DC voltage.

A resonant tank comprised of an inductor 10 and capacitor 12 is used to filter the output of the inverting transistors 6 and 8 and provide the filter power signals to the lamp 14 which is represented by a resistor 14 in FIG. 1. To reduce the turn-off losses associated with the transistors 6 and 8, two snubber capacitors 16 and 18 are connected in parallel with the transistors 6 and 8 of a preferred ballast 2 of the present invention as shown in FIG. 1. In the normal case, the capacitors 16 and 18 reduce the turn-off losses associated with the switches 6 and 8. However, all of the energy stored in the capacitors 16 and 18 when the switches 6 and 8 are turned off, will be dissipated in the switches 6 and 8 at the turn-on. Thus, in a preferred embodiment such as an IHRV ballast, an extended dead time that allows the capacitors 16 and 18 to discharge is created between the gating signals of the transistors 6 and 8 to deal with this problem. Since the load current flowing through the lamp 14 is highly inductive during this extended dead time, the load 14 current will discharge the snubber capacitors 16 and 18 during the extended dead time. Thus, at the turn-on, there are no switching losses in the transistors 6 and 8 of a preferred embodiment of the present invention. Furthermore, at turn-off, the switching losses are also completely removed through the use of capacitors 16 and 18. As a result, there are substantially no switching losses in the inverter of the ballast and the use of a 770V half bridge inverter becomes economically feasible. However, in order to use the lossless snubber capacitors 16 and 18 of FIG. 1, the amplitude of the load 14 current should be high at the turn-off and the dead time should be large enough to allow the snubber capacitors 16 and 18 to be discharged. The length of the dead time is adjusted by controlling the gating signals provided from the microcontroller 11 to the transistors 6 and 8. As will be appreciated by those skilled in the art, the time required for the snubber capacitors 16 and 18 to discharge will depend upon the capacitance of the particular capacitors 16 and 18 and the amount of charge stored on the capacitors 16 and 18. Alternatively, only one capacitor can be used instead of the two capacitors 16 and 18. However, the use of a single capacitor may be disadvantageous in that, whenever there is not enough load current to discharge the capacitor, the energy stored in the capacitor will be dissipated in the transistor or FET connected in parallel with it. Thus, if there is only one capacitor, then the dissipated energy is concentrated in only one FET or transistor. With two capacitors 16 and 18, as shown in FIG. 1, the voltage stress is substantially equally distributed across both switches 6 and 8 and, thus, the reliability and robustness of the ballast 2 is increased.

Figure 2:
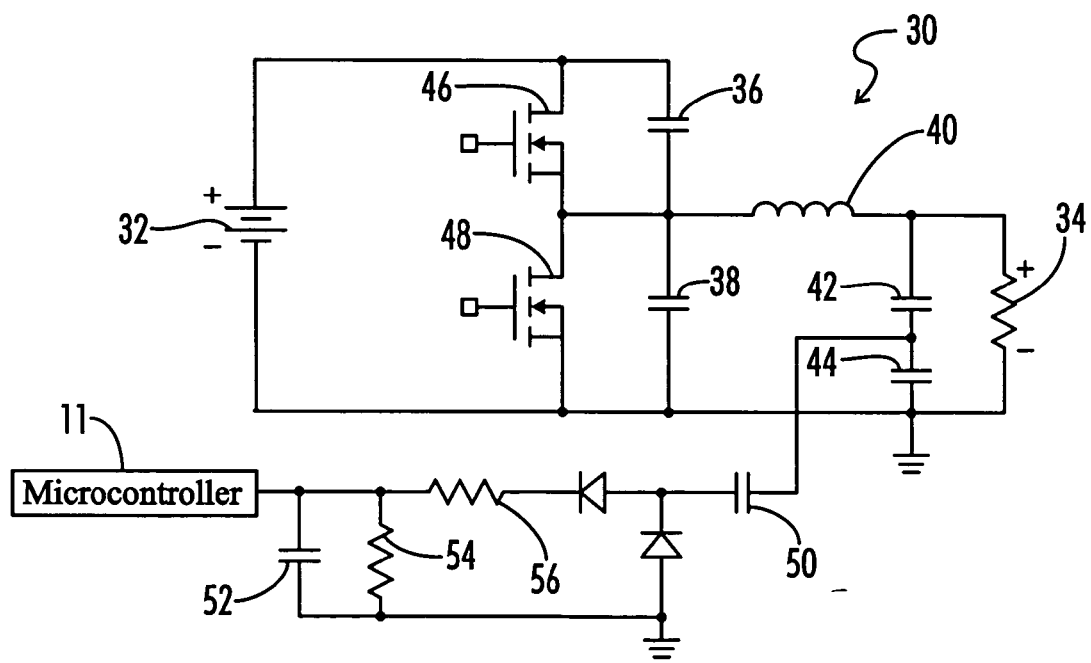
FIG. 2 is a schematic diagram of a lossless lamp voltage sampling circuit having a lossless snubber circuit constructed in accordance with a preferred embodiment of the present invention.

Referring now to FIG. 2, an electronic ballast 30 with a series resonant tank that utilizes lossless sampling of the lamp voltage 34 in conjunction with the lossless snubber capacitors 36 and 38 of a preferred embodiment of the present invention is shown. The electronic ballast 30 includes a bulk DC voltage source 32 that provides power to the inverter circuit transistors 46 and 48. The series resonant tank is comprised of a resonant tank inductor 40 and a resonant tank capacitor 42. Prior art circuits use a resistor connected in series with the resonant capacitor 42 to sense the lamp voltage 32 and control the open circuit voltage. However, in the newly developed circuit of a preferred embodiment of the present invention for an IHRV ballast and/or sign ballast, the lamp voltage 34 is sensed by a sampling capacitor 44 connected in series with the resonant capacitor 42 as shown in FIG. 2. Using the principle of voltage division with capacitors, when the sampling capacitor 44 is much bigger than the resonant capacitor 42, the voltage drop on the sampling capacitor 44 is very small and vice versa. This is beneficial in that it is relatively easy to find a film capacitor 44 that has a small package size and is relatively inexpensive. Most preferably, the capacitor's 44 values are 330 nF 60V or 680 nF 60V. A sampling circuit comprised of capacitors 50 and 52 and resistors 54 and 56 is used to sample the voltage on capacitor 44. The sampling circuit of FIG. 2 provides a low output impedance, a strong signal with excellent signal to noise ratio and a quick response time to an A/D converter input of an associated microcontroller. Thus, the circuit of FIG. 2 uses lossless snubber capacitors 46 and 48 and capacitor 44 based voltage division to improve the efficiency of the ballast 30 without sacrificing performance.

Figure 3:
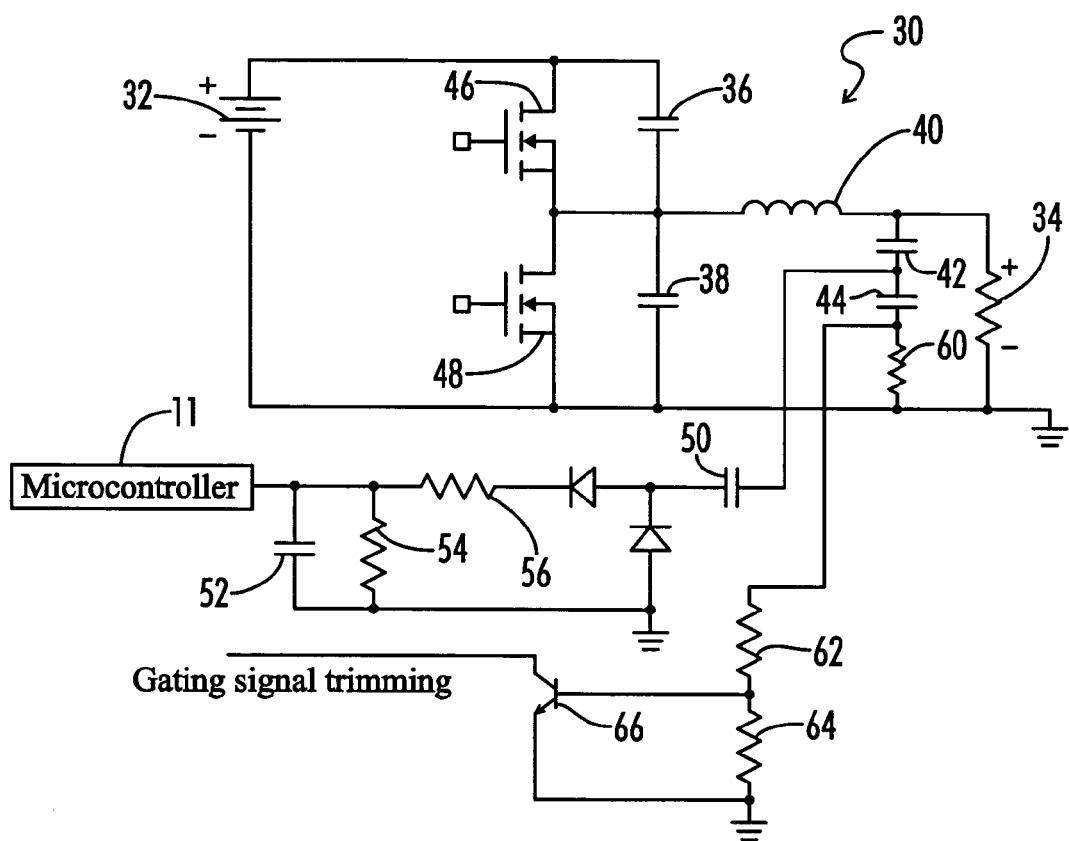
FIG. 3 is a schematic diagram of a hybrid sampling circuit having a lossless snubber circuit constructed in accordance with the present invention.

The sampling capacitor 44 used in the ballast of FIG. 2 can also be connected in series with a low value resistor 60, which can be used to control the open circuit voltage 34 as shown in FIG. 3. The hybrid sampling circuit shown in FIG. 3 samples a large amplitude version of the lamp voltage 34 across a capacitor 44. The sampled signal is smoothed by RC filters formed by capacitors 50 and 52 and resistors 54 and 56 and then fed to the A/D converter of the microcontroller. The response of the lamp voltage is not fast in the circuit of FIG. 3, but it is almost entirely lossless. For open circuit voltage control, the amplitude of the voltage across resistor 60 is large enough at the striking to turn on transistor 66 to trim the pulse width of the gating signal of the upper switch 46 of the half bridge. Trimming the pulse width of the gating signal of the upper switch 46 controls the open circuit voltage. However, during steady state operation, the voltage on the resistor 60 is very small, out of phase with the voltage on capacitor 44, and still proportional to the lamp voltage 34. Hence, the lamp voltage 34 sensing is not affected by the resistor 60 during steady state operation.

The sampling circuit described above with respect to FIG. 3 can be used independently without a cable compensation circuit. Since the voltage on resistor 60 is in phase with the current of the upper switch 46, it is convenient to use it to control the open circuit voltage when no lamp is connected and to trim the pulse width of the upper switch 46 of the half-bridge as discussed above. However, when a long cable is connected and the capacitance of the cable is essentially in parallel with the resonant capacitor 42, the parameters of the resonant tank circuit constructed from inductor 40 and capacitor 42 are changed. As the result, the open circuit voltage 34 decreases when a cable is connected to the output terminals of the electronic ballast. When the value of the resonant capacitor 34 is small, the decrease in the open circuit voltage 34 is significant and the ballast will not strike the lamp. The open circuit voltage can be set high to start a lamp with a long cable. However, in applications where no cable is attached, the open circuit voltage is then too high, which may cause the ballast to fail the through-lamp leakage test, or damage the film capacitor 44. Increasing the capacitance of the resonant capacitor 42 helps to decrease the variation of the open circuit voltage but increases the conduction losses due to the circulation currents in the resonant capacitors. Furthermore, larger capacitor values lead to saturation of the resonant inductor 40. Therefore preferred embodiments of the present invention include a cable compensation circuit.

Figure 4:
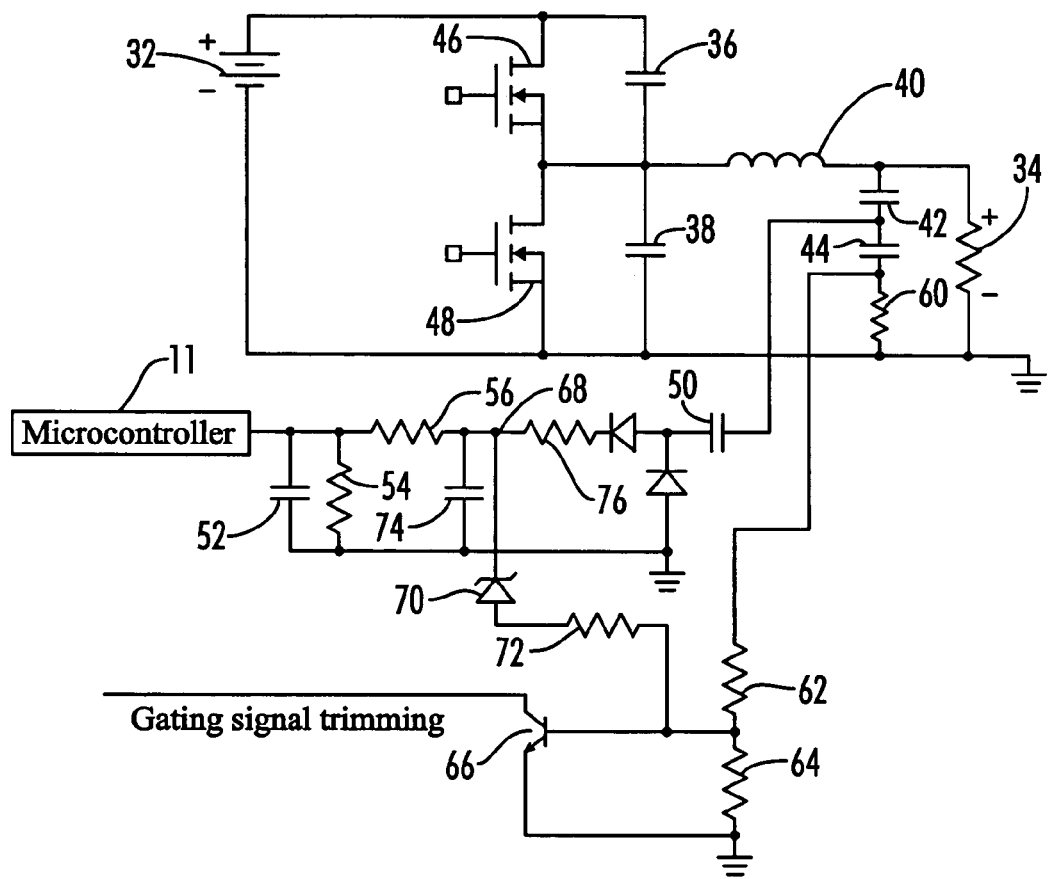
FIG. 4 is a schematic diagram of a cable compensation circuit having a lossless snubber circuit constructed in accordance with a preferred embodiment of the present invention.

Capacitor sampling provides a strong sample signal with low output impedance and quick response. A cable compensation circuit is created by adding zener diode 70, resistors 72 and 76, and capacitor 74 to the circuit of FIG. 3 as set forth in FIG. 4. The open circuit voltage 34 as sampled by capacitor 44 rises very rapidly at node 68. When the open circuit voltage 34 becomes too high, the zener diode 52 starts to conduct and feeds current to the base of transistor 66 such that the conductive threshold for the transistor 66 is decreased. Thus, the transistor 66 starts to turn-on earlier when the voltage on resistor 60 is lower. The pulse width of the gating signal of the upper switch 46 then becomes narrower. The true open circuit voltage is sensed in this way to change the current threshold required to turn-off the switch 46. In an exemplary circuit constructed as described above, the open circuit voltage varies from 1.9 kV to 2.6 kV without the cable compensation circuit when 18 feet of cable is connected to or removed from the circuit. However, with the cable compensation circuit of FIG. 4, the variation in the open circuit voltage is within approximately 100V. Thus, an electronic ballast having lossless snubber capacitors and a cable compensation circuit in accordance with the embodiment of the present invention shown in FIG. 4 represents a substantial improvement upon the prior art.

Thus, although there have been described particular embodiments of the present invention of a new and useful Lossless Snubber Capacitor Circuit, it is not intended that such references be construed as limitations upon the scope of this invention except as set forth in the following claims.

What is claimed is:

1. An electronic ballast for producing an output voltage on a pair of output terminals for igniting and powering a gas discharge lamp connected between said output terminals, said ballast comprising:
    an inverter having a pair of transistors; and
    a snubber circuit for reducing turn off losses in the transistors wherein said snubber circuit comprises a pair of series connected snubber capacitors connected in parallel with said pair of transistors;
    wherein a turn off time for said transistors is selected to correspond to a discharge time of said snubber capacitors and a high amplitude load current.

2. The electronic ballast of claim 1 wherein an extended dead time is created between gating signals of said pair of transistors to allow said snubber capacitors to discharge.

3. The electronic ballast of claim 1 further comprising an open circuit voltage control circuit that controls a voltage across said output terminals when said gas discharge lamp is not connected between said output terminals.

4. The electronic ballast of claim 3 wherein said open circuit voltage control circuit includes a resistor connected in series with a tank capacitor of said ballast.

5. The electronic ballast of claim 1 further comprising a resonant tank having a series connected tank inductor and tank capacitor and an output voltage sensing circuit that senses an output voltage of said ballast by sensing a voltage across a sampling capacitor connected in series with said tank capacitor.

6. The electronic ballast of claim 1 further comprising a cable compensation circuit that limits variations in the output voltage of said electronic ballast due to a cable being connected to the output terminals of the ballast.

7. The electronic ballast of claim 6 wherein said cable compensation circuit limits variations in said output voltage by altering gating signals provided to said transistors.

8. An electronic ballast for providing an output voltage on a pair of output terminals for use in powering a gas discharge lamp, said ballast comprising:

an inverter circuit having a first transistor and a second transistor; and a substantially lossless snubber circuit for reducing turn off losses in said first transistor and said second transistor of said inverter;

wherein a pulse width of a gating signal for said transistors is altered in response to a high amplitude load current between said output terminals.

9. The ballast of claim 8 wherein said snubber circuit comprises a snubber capacitor connected in parallel with each of said first transistor and said second transistor.

10. The ballast of claim 9 wherein an extended dead time is created between said gating signals of said transistors to allow said snubber capacitors to discharge.

11. The electronic ballast of claim 8 further comprising an open circuit voltage control circuit that controls a voltage across said output terminals of said ballast when a gas discharge lamp is not connected between said output terminals.

12. The electronic ballast of claim 8 further comprising a resonant tank having a tank capacitor and a tank inductor.

13. The electronic ballast of claim 12 further comprising a sampling capacitor connected in series with said tank capacitor wherein an output voltage of said ballast is sampled across said sampling capacitor.

14. An electronic ballast, comprising:

a half-bridge inverter circuit including a pair of transistors and a pair of capacitors, each capacitor connected in parallel with one of the transistors; and a microcontroller for generating transistor switching control signals that cause the transistors to switch on and off at a rate that allows the capacitors to reduce turn off losses in the transistors.

15. The electronic ballast of claim 14 wherein an extended dead time is created between gating signals of said pair of transistors to allow said capacitors to discharge.

16. The electronic ballast of claim 14 further comprising an open circuit voltage control circuit that controls a voltage across output terminals of said ballast when a gas discharge lamp is not connected between said output terminals.

17. The electronic ballast of claim 14 further comprising a cable compensation circuit that limits variations in an output voltage due to cables being connected to outputs of the ballast.

18. The electronic ballast of claim 14 further comprising a resonant tank having a series connected tank inductor and tank capacitor.

19. The electronic ballast of claim 18 further comprising a sampling capacitor connected in series with said tank capacitor wherein an output voltage of said ballast is sampled across said sampling capacitor.

20. The electronic ballast of claim 19 further comprising a resistor connected in series with said sampling capacitor wherein a voltage across said resistor is used to limit said output voltage of said electronic ballast.

* * * * *